(12) United States Patent
Panneer et al.

(10) Patent No.: US 10,291,890 B2
(45) Date of Patent: May 14, 2019

(54) TOUCH INTERFACE FOR A PROJECTION DEVICE

(71) Applicant: Intel Corporation, Santa Clara, CA (US)

(72) Inventors: Selvakumar Panneer, Hillsboro, OR (US); Carl S. Marshall, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/404,371

(22) Filed: Jan. 12, 2017

(65) Prior Publication Data

US 2018/0196576 A1    Jul. 12, 2018

(51) Int. Cl.
*H04N 9/31* (2006.01)
*G06F 3/041* (2006.01)
*G06F 3/042* (2006.01)

(52) U.S. Cl.
CPC ......... *H04N 9/3164* (2013.01); *G06F 3/0416* (2013.01); *G06F 3/0425* (2013.01)

(58) Field of Classification Search
CPC .... G06F 3/0421; G06F 3/0416; H04N 9/3164
See application file for complete search history.

(56) References Cited

U.S. PATENT DOCUMENTS

2013/0257748 A1*  10/2013  Ambrus ............. G02B 27/0093
                                                        345/173
2015/0358594 A1   12/2015  Marshall et al.
2017/0068393 A1*   3/2017  Viswanathan ........ G06F 3/0416

* cited by examiner

*Primary Examiner* — Liliana Cerullo
(74) *Attorney, Agent, or Firm* — International IP Law Group, P.L.L.C.

(57) ABSTRACT

In one example, a projection device includes a first light source to provide visible optical radiation. Additionally, the projection device includes a second light source to provide invisible optical radiation. Further, the projection device includes a projection mechanism. Also, the projection device includes a depth receiver. The projection device further includes a processor to cause the projection mechanism to project each of a group of pixels in a frame of an image using optical radiation provided by both the first light source and the second light source.

33 Claims, 9 Drawing Sheets

100

300

900

TOUCH INTERFACE FOR A PROJECTION DEVICE

BACKGROUND

Touch interfaces, also known as touch screens, can be touch panels installed over a computing device display that detect the resistive and capacitive energy of a finger on the touch panels. This can make it possible to select an item shown on the display by touching the touch screen at the location on the display where the item is being shown.

With the advent of computer projection, instead of showing the computer display through a touch screen, the computer display may be projected on a target projection surface. The target projection surface can be a non-interactive surface such as, a theatre screen, a wall, a ceiling, and so on, that may reflect the projected image to make the image viewable. However, in contrast to touch screens, which have a native ability to detect touches, the target projection surface is typically not capable of detecting resistive and capacitive touches.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

A touch input, i.e., a touch, is a gesture typically performed on a touch screen, and may include a single tap, double tap, swipe, zoom motion, and the like. A zoom motion is a request to zoom into, or out of, a view of an image, and can be performed with two pointer fingers, e.g., the thumb and forefinger. To zoom in, the fingers may be brought together. To zoom out, the fingers may be spread apart.

In some embodiments, a zoom motion and other types of touches may be performed with one or more fingers, cues, or any other pointing devices capable of providing touches on a projection surface. A projection surface may be any surface upon which a projection device projects images, such as, a wall or a movie screen, for example. Some embodiments include a projection device that makes it possible for a connected computing device to provide a touch screen-like interface on projected images. The location of the touch may be determined at the resolution of one pixel, and at or near real-time.

Figure 1:
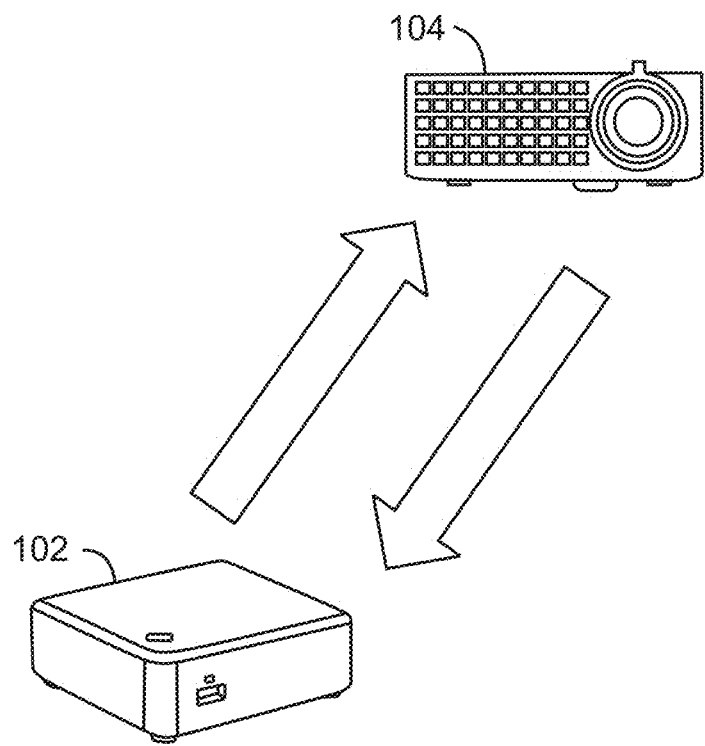
FIG. 1 illustrates an example touch interface projection system.

FIG. 1 illustrates an example touch interface projection system 100. The touch interface projection system 100 includes a computing device 102 and a projection device 104. The computing device 102 may be any computing resource such as, for example, a desktop computer, laptop, tablet, smartphone, gaming console, and the like. The arrows in FIG. 1 represent the flow of information from the computing device 102 to the projection device 104, and back to the computing device 102. The information flowing from the computing device 102 to the projection device 104 may include image data, i.e., information about images such as the locations and colors of the pixels in the image.

Typically, image data is provided in frames, where a frame may represent one image for projection. The frame itself contains many pixels, where a pixel is a single dot of color(s) in the frame. The projection device 104 makes images appear on a projection surface by projecting many frames of images on that surface. The projection device 104 makes images from the computing device 102 appear continuous, but can actually project one pixel in one frame at a time. The projection device 104 times the projections of the multiple pixels each in their individual frames so the viewer perceives that the images are continuous.

The projection device 104 may be any projector or micro-electrical-mechanical system (MEMS) that can project optical radiation in two forms, visible optical radiation providing the colored light of each frame, and invisible optical radiation, which is used to determine the depth of the pixels in each frame. Thus, the projection device 104 may determine information about the depth of each of the projected pixels, and provide this depth information to the computing device 102. This flow of the depth information is represented by the arrow flowing from the projection device 104 to the computing device 102.

Using the depth information provided by the projection device 104, the computing device 102 may determine the actual depth of each projected pixel. Knowing the depths of the projected pixels may make it possible to identify where the target projection surface is, and where one or more pointer(s) may be located. The target projection surface may be a surface such as, a wall or movie screen, for example, on which the projection device projects apparently continuous images in focus. With the depth information about the target projection surface and the pointer(s), it is possible to determine whether a touch is occurring, i.e., whether the pointer(s) is at, or near, the same depth as the target projection surface.

Figure 2:
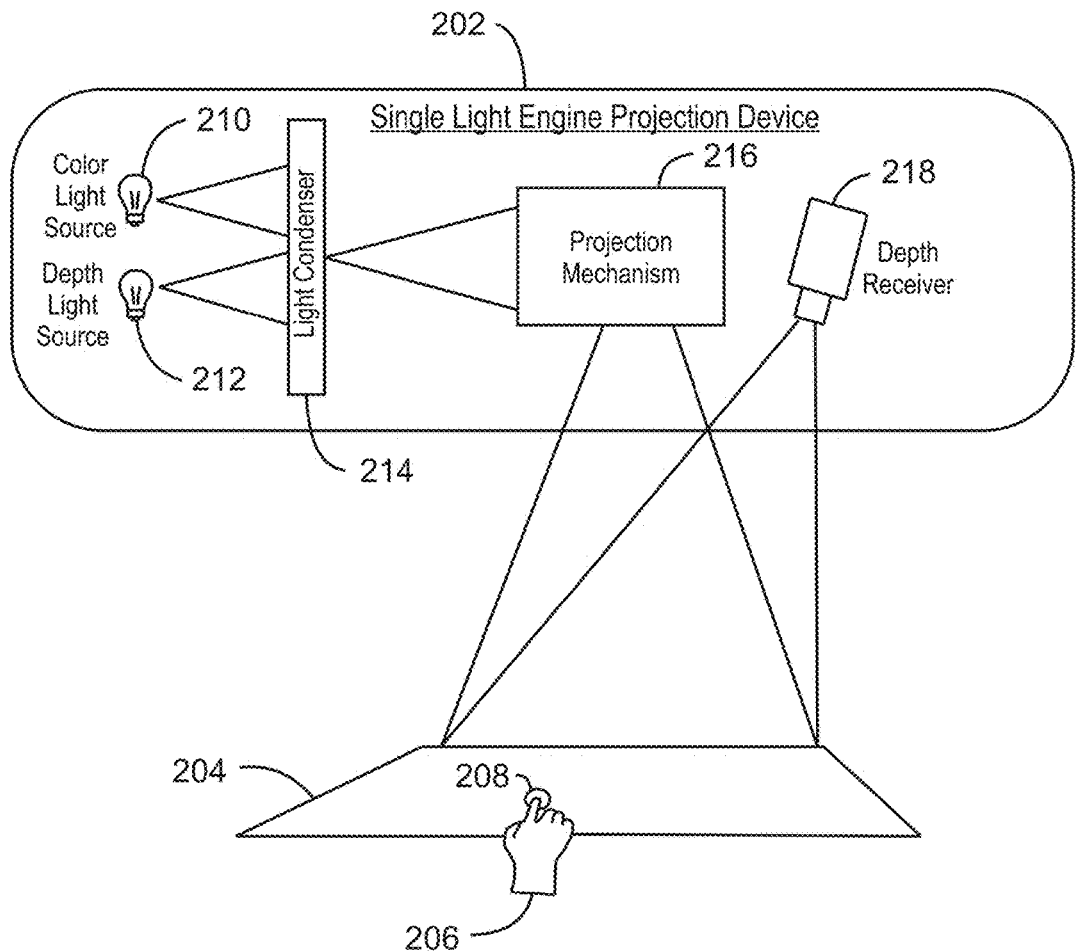
FIG. 2 illustrates an example single light engine projection device projecting a frame on a target projection surface.

FIG. 2 illustrates an example single light engine projection device 202 projecting a frame on a target projection surface 204. In some embodiments, projection device 202 may be the same as and/or similar to projection device 104. The target projection surface 204 may be any arbitrary planar or non-planar surface that may reflect the projected frame. Example target projection surfaces 204 include a variety of surfaces such as, projection screens, walls, ceilings, floors, textured surfaces of varying sizes and shapes. Target projection surfaces may vary in size, too, from the sizes of the previous examples and larger, down to the size of a coffee mug and smaller. Near the target projection surface 204, a human hand 206 includes an example pointer, fingertip 208. In some embodiments, a touch is provided when the fingertip 208 touches the target projection surface 204. When located between the projection device 202 and the target projection surface 204, objects such as the hand 206 and fingertip 208, may provide an alternate projection surface to the target projection surface 204. Accordingly, the term, actual projection surface is used to reference the projection surface where a projected pixel actually lands, e.g., the hand 206, the fingertip 208, or the target projection surface 204.

To help determine if the fingertip 208 touches the target projection surface 204, the projection device 202 may generate depth information about the projected pixels. To generate the depth information, the projection device 202 includes a color light source 210, a depth light source 212, light condenser 214, projection mechanism 216, and depth receiver 218. The projection device 202 illuminates the target projection surface 204 with the visible optical radiation of the color light source 210 (color light), and the invisible optical radiation of the depth light source 212 (depth light) for each pixel of each frame projected. Information about when the depth light is projected, and when the depth light is received by the depth receiver 218 may help a computing device, such as computing device 102, for example, to determine whether the fingertip 208 is touching the target projection surface 204. More specifically, this information about when the depth light is projected and received may be used to determine depth light travel time information for the projected pixels.

The depth light travel time provides information about the depth of a projected pixel because depth light travel time is the amount of time that light, e.g., depth light, takes to travel from the lens of the projection device 202 to the projected pixel on the actual projection surface 204, and back to the depth receiver 218 of the projection device 202. Because the depth of a pixel is the distance from the lens of the projection device 202 to the projected pixel on the actual projection surface, the depth light travel time represents how long the depth light takes to travel the depth of the projected pixel, twice. In this way, the depth light travel time represents depth information about the projected pixels.

In some embodiments, the projection device 202 integrates color projection and depth-based technologies to help determine depth light travel time. The color light source 210 may provide light of various colors, and may include, for example, a light-emitting diode (LED), a laser, and/or a hybrid LED-laser. The depth light source 212 may be a laser, light detection and ranging (LiDAR) system, infrared (IR) emitter, and/or other invisible light source. Alternatively, the depth light source 212 may be structured IR. Structured IR is a light source that projects a pattern on an object in order to determine distances to various parts of the object. With structured IR, the distances are determined using a triangulation method described with respect to FIG. 5.

Referring back to FIG. 2, in some embodiments, the color light source 210 and depth light source 212 for a given pixel shine on the light condenser 214. The light condenser 214 may be an optical lens that condenses each of the color light and/or depth light into their own convergent beams, which are directed towards the projection mechanism 216. The projection mechanism 216 may be a device such as, a digital light projection (DLP) chip, liquid-crystal on silicon (LCOS), or other device capable of projecting color and/or depth light pixel-by-pixel on actual projection surfaces. The projection mechanism 216 projects the condensed beam(s) from the light condenser 214 towards the target projection surface 204 at the location of the specific pixel being projected. The angled lines extending from the projection mechanism 216 to the target projection surface 204 represent a field of illumination of the projection mechanism 216.

Additionally, the single light engine may direct the depth receiver 218 to determine when the depth light arrives back at the projection device 202 when the depth light is reflected back from the actual projection surface. The depth receiver 218 may be any type of device capable of detecting the invisible light of the depth light source 212, and of determining when the depth light arrives back at the depth receiver 218 after being reflected by the target projection surface 204, hand 206, pointer 208, or another object. The angled lines extending from the depth receiver 218 represent a field of view of the depth receiver 218.

Because the single light engine determines when the depth light source 212 is illuminated, and the depth receiver 218 knows when the depth light is received, it is possible to determine the depth light travel time for each pixel projected by the projection device 202. In some embodiments, the projection device 202 may provide the depth light travel time data to a connected computing device such as, for example, computing device 102, which may determine whether the fingertip 208 is providing a touch based on the depth light travel time data for the projected pixels.

Figure 3:
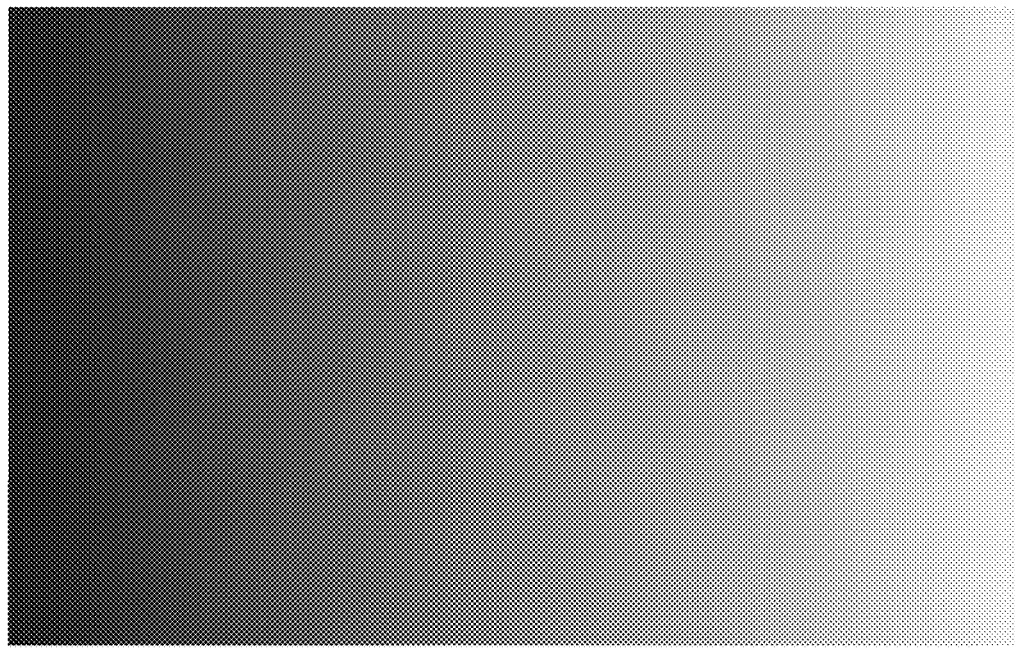
FIG. 3 illustrates an example depth perception capture of a planar target projection surface.

FIG. 3 illustrates an example depth perception capture 300 of a planar target projection surface. The grayscale color values represent the distance from a projection device to each projected pixel position. Specifically, the lightest grayscale color values represent the pixels closest to a projection device, and the darkest grayscale color values represent the pixels furthest from the projection device. In the depth capture 300, the projection device appears to be closest to the far right side of the target projection surface because the lightest pixels are on the far right side of the depth capture 300. Similarly, the projection device appears furthest from the far left side of the target projection surface because the darkest pixels of the depth capture 300 are on the far left side.

Figure 4:
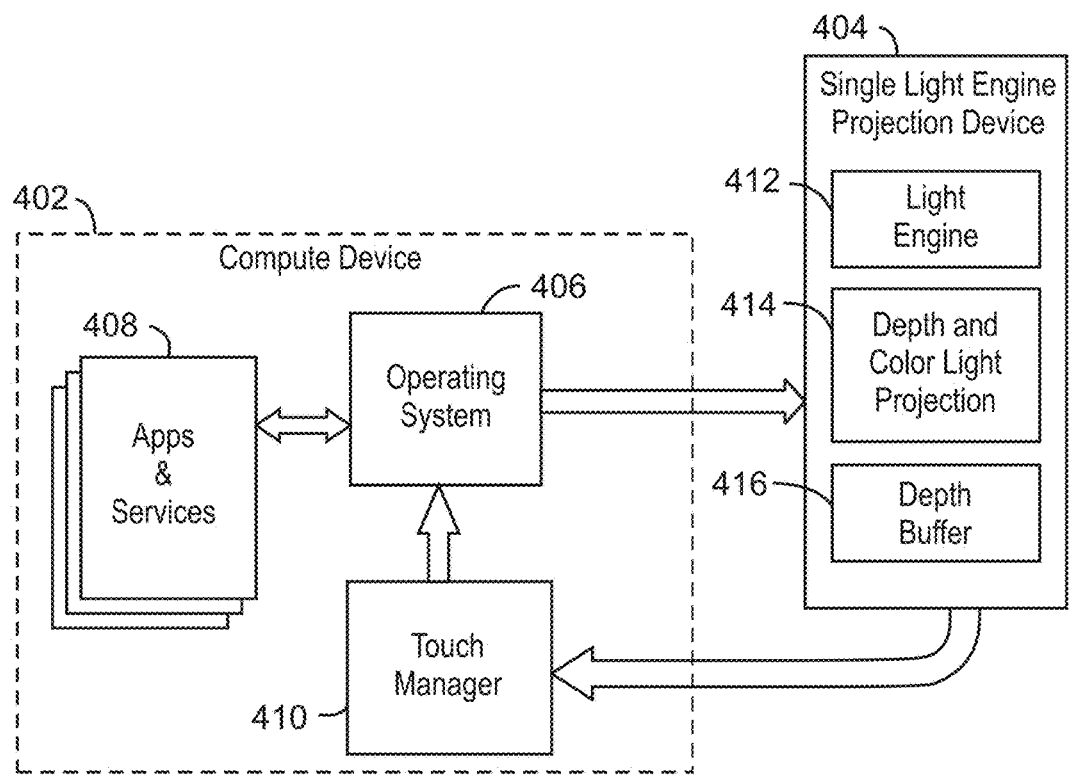
FIG. 4 illustrates an example touch interface projection system.

FIG. 4 illustrates an example touch interface projection system 400. The system 400 includes a computing device 402 that is connected, or otherwise in communication with, a single light-engine projection device 404. The computing device 402 includes operating system 406, applications (apps) and services 408, and a touch manager 410. The operating system 406 may be a collection of computer programs used to operate the computing device 402. The apps and services 408 may include various computer programs running on the computing device 402, including one or more programs that may use a touch interface on projected images. In some embodiments, the apps and services 408 may make a request to the operating system 406 to project an image that the requesting application or service is using as a touch interface. This request is represented by the right side of the two-way arrow showing a communication link between the apps and services 408 and the operating system 406. The left-side arrow of this communication link is described below with respect to the touch manager 410. Alternatively, the operating system 406 may request the projection device 404 to project a touch interface image for the operating system 406 itself.

Based on the request to project the touch interface image, the operating system 406 may send frames of the touch interface image to the projection device 404. This transfer of image data is represented by the rightward arrow showing a communication link from the operating system 406 to the projection device 404. This communication link may be any link suitable for transferring data about digital images such as, for example, high definition multimedia interface (HDMI), Display Port (DP), digital video interface (DVI), wireless display (WiDi), and the like.

The projection device 404 includes a light engine 412, which directs depth and color light projection 414 as described above with respect to FIG. 2. Referring back to FIG. 4, the light engine 412 also provides the time each depth light pixel is projected (the projection time) to a depth buffer 416. The depth buffer 416 may be an area of memory and/or storage that is used to store the depth light travel time information about projected pixels. As described above, a depth receiver such as, depth receiver 218 determines when the depth light arrives back at the depth receiver 218 after reflecting back from the actual projection surface (the arrival time). Accordingly, the light engine 412 directs the depth receiver 218, for example, to provide the arrival time to the depth buffer 416. In some embodiments, when the light engine 412 projects the depth light, the light engine 412 may also direct the depth receiver 218 to turn on, in order to conserve energy.

As stated previously, the depth light travel time for each pixel may be determined by subtracting the projection time from the arrival time. Further, the depth may be determined based on the depth light travel time. Accordingly, the data in the depth buffer 416 may be provided to the computing device 402, as illustrated in the arrow from the depth buffer 416 to the touch manager 410, in order to enable the touch manager 410 to determine whether a touch has been provided.

The touch manager 410 may be one or more applications running as system software on the computing device 402 that are capable of determining whether a touch has been provided by determining the depth of each projected pixel of each frame. By knowing the depth of projected pixels, and in what frame the pixels are projected, it is possible for the touch manager 410 to identify a pointer, and determine whether the pointer is at or near a target projection surface, such as target projection surface 204. The identification of the pointer, and the determination of whether a touch occurred, is described in greater detail with respect to FIGS. 6 and 7.

As stated previously, the depth light source 212 may be LIDAR, wherein the depth receiver 218 may be referred to as a time of flight camera. In such embodiments, the touch manager 410 may determine the depth of pixels projected by LIDAR using Formula 1:

Depth=(Depth Light Travel Time×c)/2

Formula 1

In Formula 1, c represents the speed of light. As such, the depth light travel time multiplied by c represents the actual distance that the depth light travels between the projection time and the arrival time. As stated previously, the actual distance travelled by the depth light between these times is equal to twice the distance from the projection device to the projected pixel, i.e., twice the depth. Thus, the depth may be determined by dividing the actual distance travelled, by two.

Once a touch is identified, the touch manager 410 sends the touch information, e.g., relative (x, y) pixel location(s) of the touch, when the touch occurs, and so on, to the operating system 406. The communication link for this data transfer is represented by the arrow from the touch manager 410 to the operating system 406. Once the operating system 406 is notified of the touch, the operating system 406 broadcasts the touch information to the apps and services 408. This broadcast occurs over a communication link represented by the left side of the two-sided arrow between the operating system 406 and the apps and services 408. Using the touch information, the apps and services 408 and the operating system 406 may be able to determine whether the touch is relevant to their processing, and to take the appropriate action.

Figure 5:
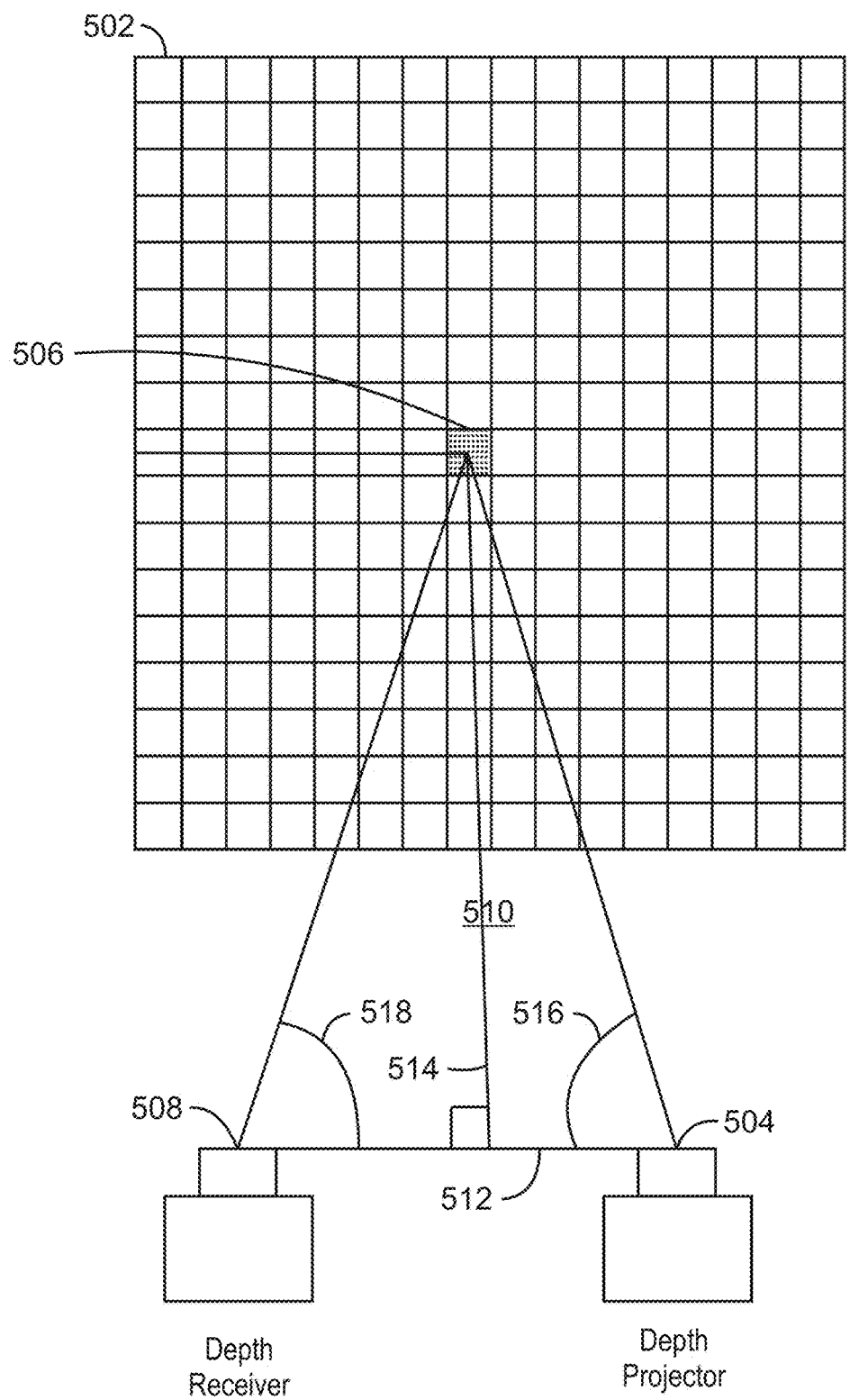
FIG. 5 illustrates an example process for determining depth in a touch interface projection system.

FIG. 5 illustrates an example approach for determining depth for structured IR. In FIG. 5, a frame 502 is shown, in grid form, as projected from a depth projector 504. Each box of the grid represents an individual pixel of the projected frame 502. A pixel 506 represents a pixel for which the distance is determined in this example. The depth projector 504 may be one or more devices capable of illuminating and projecting depth light towards each pixel in a frame such as, the depth light source 212 and projector mechanism 216 described with respect to FIG. 2. In this example, the depth projector 504 projects structured IR.

In some embodiments, a structured IR depth projector, the pixel being illuminated, and the depth receiver 508 form a triangle 510, with a base 512 of known length, b. The length, b, may be known because the depth projector 504 and the depth receiver 508 may be fixed with respect to each other. Forming a triangle is useful because there is a trigonometric formula to determine depth called triangulation. In triangulation, the depth, d, may be determined if the measure of two angles, α and β, and the length of the base, b, are known.

In this example, d, the depth of the pixel 506 is represented by the line 514 between the pixel 506 and the base 512, with which the line 514 forms a right angle. The angle of projection 516, α, and angle of incidence, β, are known because the depth projector 504 specifically directs the depth light towards the pixel 506 at angle, α. Additionally, the depth receiver 508 may determine the angle of incidence, β, i.e., the angle at which the reflected depth light arrives at the depth receiver 508. Because the line 514 forms a right angle with the base 512, the depth, d, may be determined using triangulation according to Formula 2:

$$d=b(\sin \alpha)(\sin \beta)/(\sin \alpha+\beta)$$

Formula 2

Figure 6:
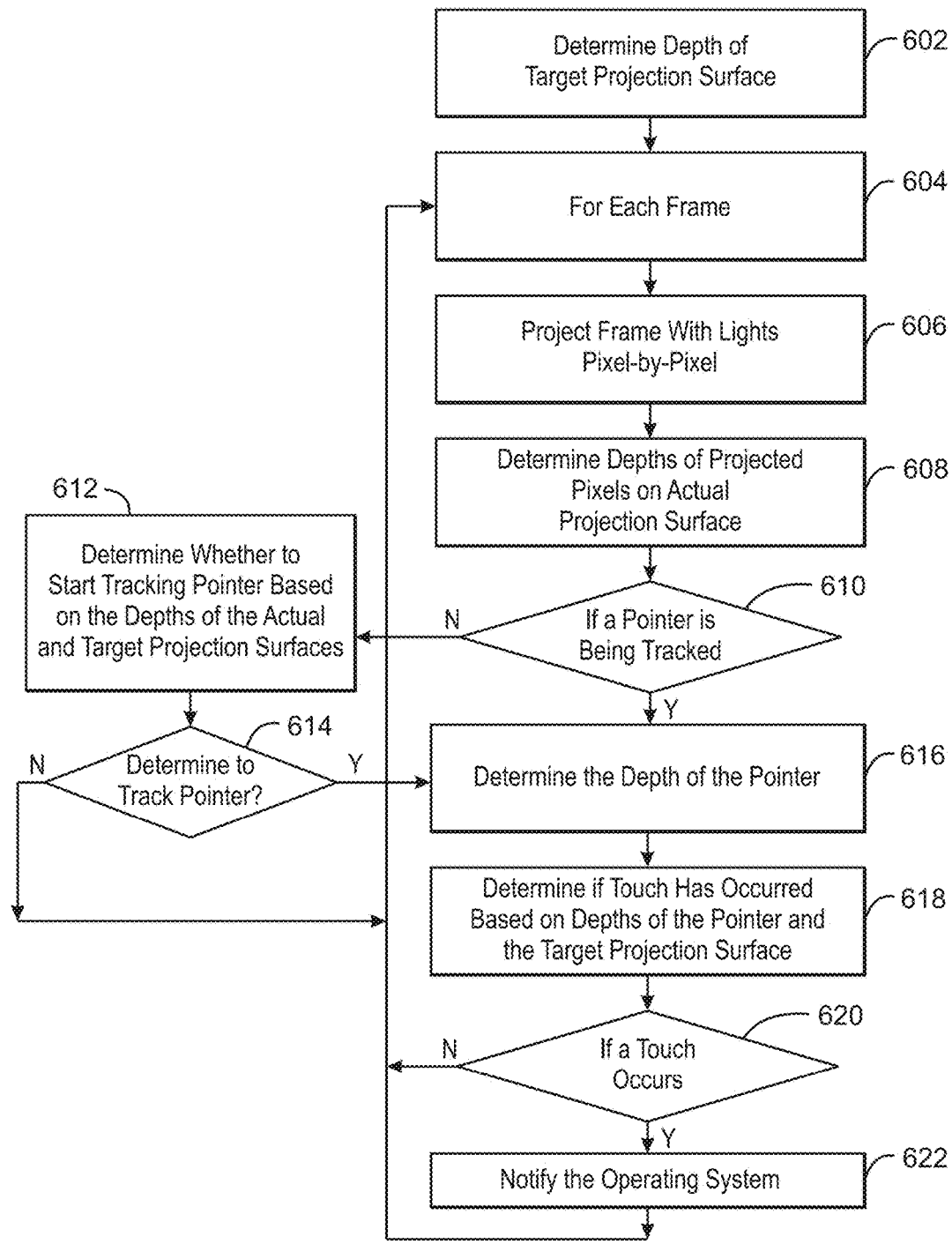
FIG. 6 illustrates a process to detect touches in a touch interface projection system.

FIG. 6 illustrates a process 600 to detect touches in a touch interface projection system. The process 600 may be performed by a light engine, such as light engine 412, and a touch manager, such as touch manager 410. At block 602, the light engine 412 and the touch manager 410 may determine the depths of a target projection surface such as, target projection surface 204. In some embodiments, the block 602 is performed using a process 700 to determine the depth of pixels projected in a touch interface projection system, which is described in greater detail with respect to FIG. 7. Referring back to FIG. 6, blocks 604 through 618 are performed for each frame projected.

At block 606, the frame is projected with lights such as, color light source 210 and depth light source 212, for example. In some embodiments, the depth light and color light are included in the same frame. Hence, the color light source 210 is illuminated at the same time the depth light source 212 is illuminated. In some embodiments, the depth light and color light are illuminated in interleaved frames. Hence, in such embodiments, the light engine 412 may illuminate the color of the pixels in the frame with color, and illuminate the depth light in subsequent (or prior) frame.

At block 608, the touch manager 410 may determine the depths of the projected pixels on the actual projection surface. As stated previously, the touch manager 410 may determine the depth of each projected pixel by using the depth light travel time data in the depth buffer 416 according to Formula 1, described with respect to FIG. 4

At block 610, the tough manager 410 may determine whether a pointer is already being tracked. In some embodiments, the touch manager may track pointers using automated vision techniques. Automatic vision techniques may be computer applications capable of identifying and tracking moving objects.

If not, at block 612, the touch manager 410 may determine whether to start tracking a pointer. In some embodiments, the touch manager 410 may determine to start tracking a pointer once the touch manager 410 has identified a pointer. The touch manager 410 may identify a pointer if there is a connected segment within successive frames that has an actual projection surface whose depth indicates a pointer is positioned between the projection device and the target projection surface.

At block 614, if the touch manager 410 determines to track a pointer, control flows to block 616. Otherwise, control flows back to block 604.

If the pointer is being tracked, at block 616, the tracking manager 410 may determine the depth of the pointer. The depth of the pointer may be represented by the depth of the pixels projecting on the pointer, instead of the target projection surface. In some embodiments, the touch manager 410 may determine that the depth of the pointer is equal to the depth of the pixel projected on the pointer, with the closest depth to the target projection surface.

At block 618, the touch manager 410 may determine whether a touch has occurred based on the pointer depth, and the depth of pixel used to determine pointer depth when that same pixel is projected on the target projection surface. If the depth of the pointer is within a threshold distance of the target projection surface, the touch manager 410 may determine that a touch has occurred.

At block 620, if a touch has not occurred, control flows back to block 604 for the next frame. If a touch has occurred, control flows to block 622.

At block 622, the touch manager 410 may notify the operating system that the touch has occurred. In this notification, the touch manager 410 may describe the touch, e.g., the relative (x, y) location(s), the duration, and the like. In this way, the touch manager 410 may determine whether and where a pointer is touching a target projection surface, at the resolution of a single pixel.

Figure 7:
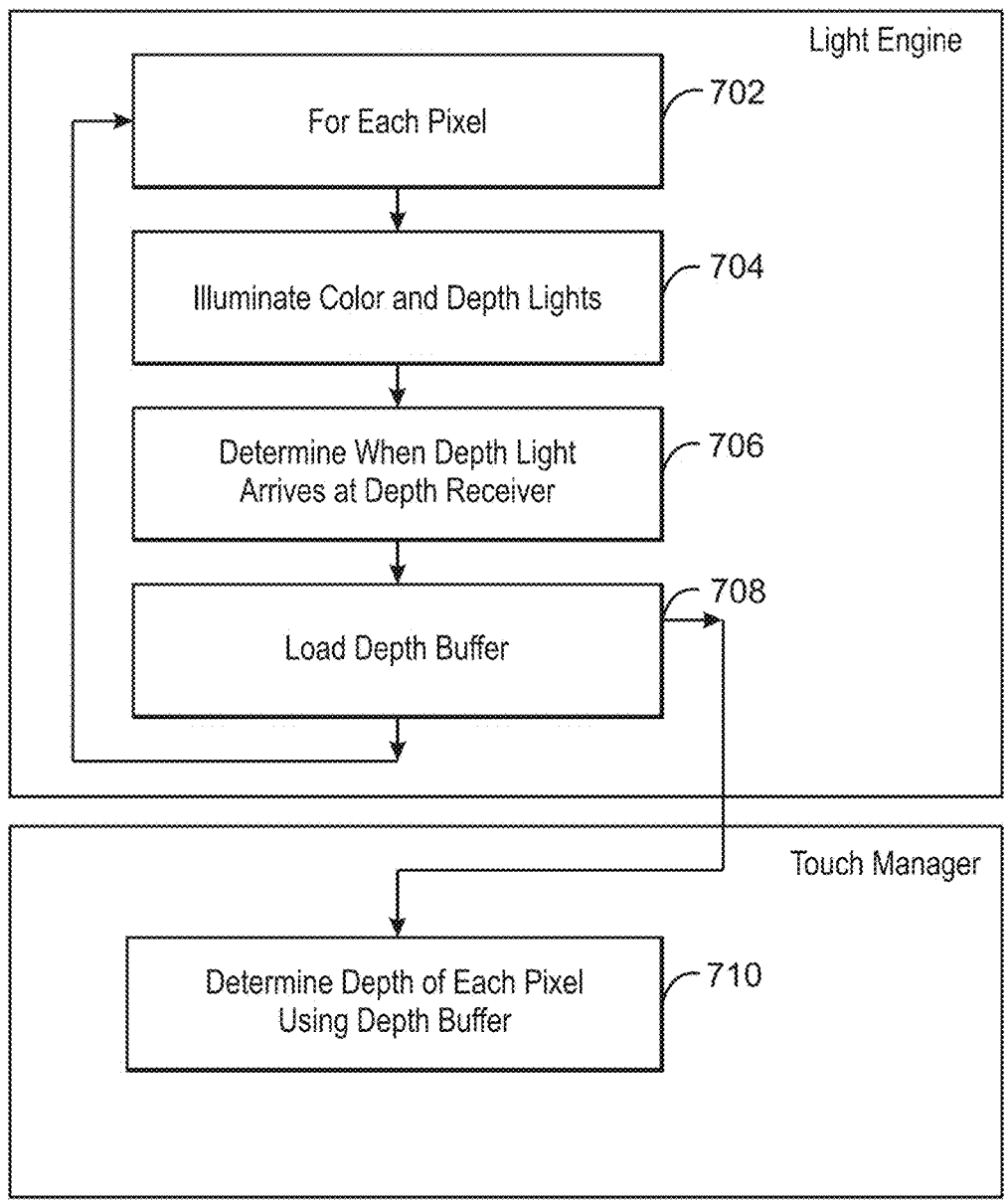
FIG. 7 illustrates a process to determine the depth of pixels projected in a touch interface projection system.

FIG. 7 illustrates a process 700 to determine the depth of pixels projected in a touch interface projection system. In some embodiments, the process 700 may be performed by a light engine of a projection device, and a touch manager, such as light engine 412 and touch manager 410, for example.

The blocks 702-708 may be performed for every pixel within a frame. At block 704, the light engine 412 may illuminate the color and depth lights. As stated previously, the depth and color lights may be projected in the same frame or interleaved frames. Thus, if the depth and color lights are included in the same frame, the depth light for a given pixel may be projected after (or before) the color light is projected. If the depth and color lights are projected in interleaved frames, the color light is projected for all the pixels in a first frame, and the depth light is projected at the same pixels in a subsequent (or prior) frame.

At block 706, the light engine 412 may determine when the depth light arrives at the depth receiver. As stated previously, when the depth light is projected, the depth light reflects of the actual projection surface and back to the depth receiver. Thus, the time of arrival helps to determine the depth light travel time.

At block 708, the light engine 412 may load the depth buffer with the projection and travel times for the projected pixel. If there are more pixels in the frame, control may flow back to block 702. Otherwise, control may flow to block 710, where the touch manager 412 may determine the depth of each pixel in the projected frame based on the contents of the depth buffer.

Figure 8:
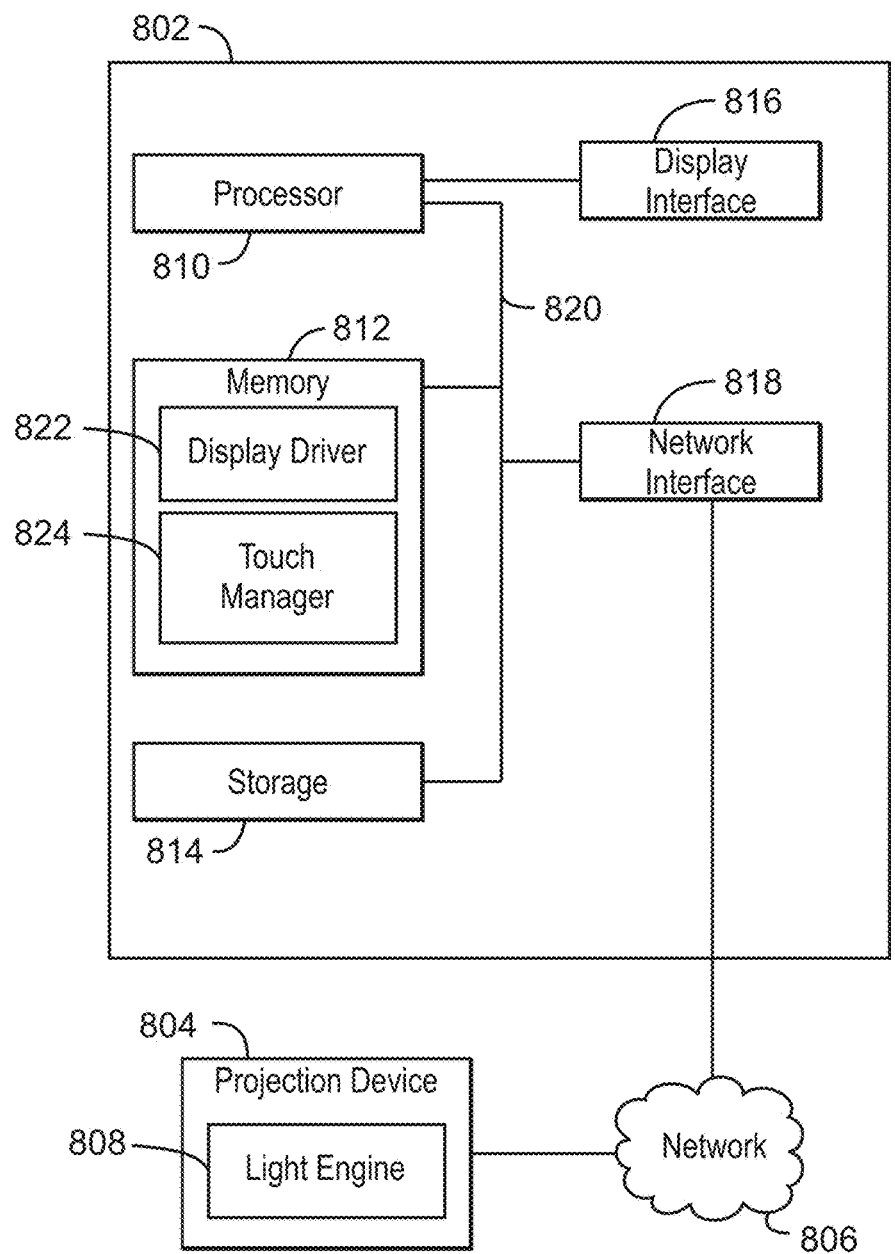
FIG. 8 illustrates an example touch interface projection system.

FIG. 8 illustrates an example touch interface projection system 800. The system 800 includes a computing device 802 and a projection device 804 in communication over a network 806. The network 806 may include any communication network, or collection of networks, capable of enabling computer communication between two or more electronic devices. In some embodiments, the network 806 is a peer-to-peer connection. The projection device 804 includes a light engine 808 as described above with respect to FIGS. 2, 4, 6, and/or 7, for example.

The computing device 802 includes a processor 810 such as, for example, a central processing unit (CPU), memory 812 such as, for example random access memory (RAM), storage 814, a display interface 816, and a network interface 818, in communication via a bus 820. The computing device 802 may be, for example, a mobile phone, laptop, tablet, phablet, wearable device, and the like. The processor 810 may execute stored instructions, and the memory 812 may store the instructions that are executable by the processor 810. The processor 810 may be a single core processor, a multi-core processor, a computing cluster, or any number of other configurations. The memory 812 may be one or more of random access memory, flash memory, or any other suitable type of volatile or non-volatile storage, memory and/or memory system. The memory 812 may include a display driver 822 and a touch manager 824. The display driver may take requests to project individual frames of touch interface images from applications and services such as, apps and services 406, for example, and translate that request to a request to the display interface 816 to direct a projection device, for example, to project the frame.

The processor 810 may also be linked through the bus 812 (e.g., PCI®, PCI-Express®, NuBus, etc.) to the display interface 816 adapted to connect the computing device 802 to a display device such as, a projection device. Additionally, the display interface 814 may provide a connection to other display devices, such as a computer monitor, television, and the like.

In some embodiments, the display interface 816 may include any suitable graphics processing unit, transmitter, port, physical interconnect, and the like. In some examples, the display interface 816 may implement any suitable protocol for transmitting image data to a display device. For example, the display interface 816 may transmit data using a high-definition multimedia interface (HDMI) protocol, and the like.

In addition, a network interface 818 may be adapted to connect the computing device 802 through the bus 820 to the network 806. The network may be a cellular network, a radio network, a wide area network (WAN), a local area network (LAN), or the Internet, among others, or a combination thereof.

The processor 810 may also be linked through the bus 812 to a storage device 814 that may include a hard drive, an optical drive, a USB flash drive, an array of drives, or any combinations thereof. In some embodiments, the storage device 808 may include any suitable applications such as, games and other interactive software.

It is to be understood that the block diagram of FIG. 8 is not intended to indicate that the computing device 802 and projection device 804 are to include all of the components shown in FIG. 8. Rather, the computing device 802 and projection device 804 may include fewer or additional components not illustrated in FIG. 8 (e.g., additional memory components, embedded controllers, additional modules, additional network interfaces, etc.). Furthermore, any of the functionalities of the computing device 802 may be partially, or entirely, implemented in hardware and/or in the processor 810. For example, the functionality may be implemented with an application specific integrated circuit, logic implemented in an embedded controller, logic implemented in the processor 810, software (e.g., an application, among others), firmware, or any suitable combination of hardware, software, and firmware. Similarly, any of the functionalities of the projection device 804 may be partially, or entirely, implemented in hardware.

Figure 9:
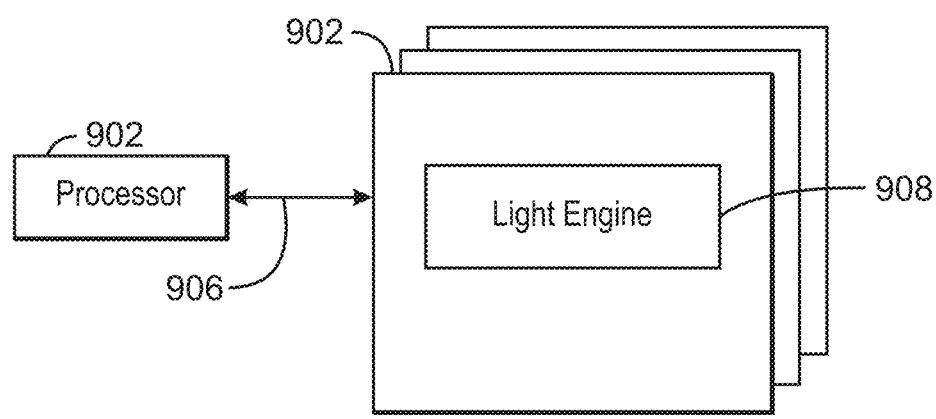
FIG. 9 illustrates an example system comprising computer-readable media for a touch interface projection system.

FIG. 9 illustrates an example system 900 comprising computer-readable media 902 for a touch interface projection system. The computer-readable media 902 may be accessed by a processor 904 over a bus 906. The processor 904 may be any computer processor, graphics processor, or combinations thereof. The computer readable medium 902 may include code configured to direct the processor 904 to perform the methods and embodiments described herein. In some embodiments, the computer readable media 902 may be non-transitory computer readable media. In some examples, the computer readable media 902 may be storage media. However, in any case, the computer readable media 902 do not include transitory media such as carrier waves, signals, and the like.

Various components discussed herein may be stored on one or more computer readable media 902, which includes a light engine 908, as indicated in FIG. 9. For example, the light engine 908 may project a color light and a depth light for a specific pixel. Additionally, the light engine 908 may direct a depth receiver to activate. This way, the depth receiver may receive the projected depth light, and determine the arrival time of the depth light. Additionally, the light engine may store the projection time of the depth light of the specific pixel in a depth buffer. Further, the light engine 908 may direct the depth receiver to store the arrival time for the pixel in the depth buffer. By passing the information in the depth buffer to the touch manager, the light manager 908 may enable the touch manager to determine whether a touch has occurred on a target projection surface.

The block diagram of FIG. 9 is not intended to indicate that the computer readable media 902 is to include all of the components shown in FIG. 9. Further, the computer readable media 902 may include any number of additional components not shown in FIG. 9, depending on the details of the specific implementation.

Reference in the specification to "an example", "some examples", "one embodiment", "some embodiments", "an embodiment", etc. of the disclosed subject matter means that a particular feature, structure, or characteristic described in connection with the embodiment or example is included in at least one embodiment or example of the disclosed subject matter. Thus, the phrase "in one embodiment" or "one example" may appear in various places throughout the specification, but the phrase may not necessarily refer to the same embodiment.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter may be practiced with various computer system configurations, including multiprocessor or multiple-core processor systems, graphics processing units, minicomputers, mainframe computers, as well as pervasive or miniature computers or processors that may be embedded into virtually any device. Embodiments of the disclosed subject matter may also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

EXAMPLES

Example 1 includes an apparatus. Some examples include a first light source to provide visible optical radiation, a second light source to provide invisible optical radiation, a projection mechanism, a depth receiver, and a processor to cause the projection mechanism to project each of a group of pixels in a frame of an image using optical radiation provided by both the first light source and the second light source.

Example 2 includes the apparatus of example 1. In some examples, the processor determines a group of projection times corresponding to the pixels, determines a group of arrival times corresponding to the pixels, the arrival times represent when the invisible optical radiation from the depth light arrives at the depth receiver, and provide the projection times and the arrival times to a depth buffer, the depth buffer is to be used to determine a group of depths between the projection device and one or more actual projection surfaces of the projected pixels, the group of depths corresponding to the group of pixels.

Example 3 includes the apparatus of example 2. In some examples, the processor determines a depth light travel time for each pixel based on the projection times and the arrival times in the depth buffer.

Example 4 includes the apparatus of example 3. In some examples, the processor determines the depths based on the depth light travel time for each pixel, the depth light travel time includes an amount of time for the depth light to travel from the projection device to the actual projection surfaces, and back to the projection device.

Example 5 includes the apparatus of example 4. In some examples, a pointer is indicated by a group of pointer depths for a group of pointer pixels that are continuous and positioned between the projection device and the target projection surface.

Example 6 includes the apparatus of example 5. In some examples, the processor determines a pointer depth of each of the pointer pixels.

Example 7 includes the apparatus of example 6. In some examples, the processor determines a touch occurs when the pointer depth of at least one of the pointer pixels indicates the pointer is in contact with the target projection surface.

Example 8 includes the apparatus of example 6. In some examples, the pointer depth includes a depth of a pixel projected on the pointer that is closer to the target projection surface than any other pixel of the set of pixels.

Example 9 includes the apparatus of example 8. In some examples, a touch is determined to occur when a difference between the pointer depth and a depth of at least one pixel on the target projection surface is within a specified threshold.

Example 10 includes the apparatus of example 1. In some examples, the first light source is illuminated in a first frame of the touch interface image, and the second light source is emitted in a second frame after the first frame.

Example 11 includes a projection apparatus. Some examples include means to provide visible optical radiation, means to provide invisible optical radiation, means to project optical radiation, the means to project optical radiation projects each of a group of pixels in a frame of an image using optical radiation provided by the means to provide visible optical radiation and the means to provide invisible optical radiation.

Example 12 includes the projection apparatus of example 11. Some examples include means to determine a group of projection times corresponding to the pixels, means to determine a group of arrival times corresponding to the pixels, the arrival times represent when the invisible optical radiation from the depth light arrives at the depth receiver, and means to provide the projection times and the arrival times to a depth buffer, the depth buffer is to be used to determine a group of depths between the projection device and one or more actual projection surfaces of the projected pixels, the group of depths corresponding to the group of pixels.

Example 13 includes the projection apparatus of example 12. Some examples include means to determine a depth light travel time for each pixel based on the projection times and the arrival times in the depth buffer.

Example 14 includes the projection apparatus of example 13. Some examples include means to determine the depths based on the depth light travel time for each pixel, the depth light travel time includes an amount of time for the depth light to travel from the projection device to the actual projection surfaces, and back to the projection device.

Example 15 includes the projection apparatus of example 14. In some examples, a pointer is indicated by a group of pointer depths for a group of pointer pixels that are continuous and positioned between the projection device and the target projection surface.

Example 16 includes the projection apparatus of example 15. Some examples include means to determine a pointer depth of each of the pointer pixels.

Example 17 includes the projection apparatus of example 16. Some examples include means to determine a touch occurs when the pointer depth of at least one of the pointer pixels indicates the pointer is in contact with the target projection surface.

Example 18 includes the projection apparatus of example 16. In some examples, the pointer depth includes a depth of a pixel projected on the pointer that is closer to the target projection surface than any other pixel of the set of pixels.

Example 19 includes the projection apparatus of example 18. In some examples, a touch is determined to occur when a difference between the pointer depth and a depth of at least one pixel on the target projection surface is within a specified threshold.

Example 20 includes the projection apparatus of example 11. In some examples, the means to provide visible optical radiation is illuminated in a first frame of the touch interface image, and the means to provide invisible optical radiation is emitted in a second frame after the first frame.

Example 21 includes one or more tangible, non-transitory computer readable media for a touch interface for a projection device, comprising a group of instructions that, in response to being executed on one or more processors, cause the one or more processors to provide visible optical radiation, provide invisible optical radiation, and project optical radiation by projecting each of a group of pixels in a frame of an image using the visible optical radiation and the invisible optical radiation.

Example 22 includes the one or more tangible, non-transitory computer readable media of example 21. In some examples, the processor determines a group of projection times corresponding to the pixels, determines a group of arrival times corresponding to the pixels, the arrival times represent when the invisible optical radiation from the depth light arrives at the depth receiver, and provides the projection times and the arrival times to a depth buffer, the depth buffer is to be used to determine a group of depths between the projection device and one or more actual projection surfaces of the projected pixels, the group of depths corresponding to the group of pixels.

Example 23 includes the one or more tangible, non-transitory computer readable media of example 22. In some examples, the processor determines a depth light travel time for each pixel based on the projection times and the arrival times in the depth buffer.

Example 24 includes the one or more tangible, non-transitory computer readable media of example 23, the processor determines the depths based on the depth light travel time for each pixel, the depth light travel time includes an amount of time for the depth light to travel from the projection device to the actual projection surfaces, and back to the projection device.

Example 25 includes the one or more tangible, non-transitory computer readable media of example 24. In some examples, a pointer is indicated by a group of pointer depths for a group of pointer pixels that are continuous and positioned between the projection device and the target projection surface.

Example 26 includes the one or more tangible, non-transitory computer readable media of example 25. In some examples, the processor determines a pointer depth of each of the pointer pixels.

Example 27 includes the one or more tangible, non-transitory computer readable media of example 26. In some examples, the processor determines a touch occurs when the pointer depth of at least one of the pointer pixels indicates the pointer is in contact with the target projection surface.

Example 28 includes the one or more tangible, non-transitory computer readable media of example 26. In some examples, the pointer depth includes a depth of a pixel projected on the pointer that is closer to the target projection surface than any other pixel of the set of pixels.

Example 29 includes the one or more tangible, non-transitory computer readable media of example 28. In some examples, a touch is determined to occur when a difference between the pointer depth and a depth of at least one pixel on the target projection surface is within a specified threshold.

Example 30 includes the one or more tangible, non-transitory computer readable media of example 21. In some examples, the first light source is illuminated in a first frame of the touch interface image, and the second light source is emitted in a second frame after the first frame.

Example 31 includes an apparatus. Some examples include a first light source to provide visible optical radiation, a second light source to provide invisible optical radiation, a projection mechanism, a depth receiver, and a processor to cause the projection mechanism to project each of a group of pixels in a frame of an image using optical radiation provided by both the first light source and the second light source.

Example 32 includes the apparatus of example 31. In some examples, the processor determines a group of projection times corresponding to the pixels, determine a group of arrival times corresponding to the pixels, the arrival times represent when the invisible optical radiation from the depth light arrives at the depth receiver, and provide the projection times and the arrival times to a depth buffer, the depth buffer is to be used to determine a group of depths between the projection device and one or more actual projection surfaces of the projected pixels, the group of depths corresponding to the group of pixels.

Example 33 includes the apparatus of examples 31 or 32. In some examples, the processor determines a depth light travel time for each pixel based on the projection times and the arrival times in the depth buffer.

Example 34 includes the apparatus of example 33. In some examples, the processor determines the depths based on the depth light travel time for each pixel, the depth light travel time includes an amount of time for the depth light to travel from the projection device to the actual projection surfaces, and back to the projection device.

Example 35 includes the apparatus of examples 34. In some examples, a pointer is indicated by a group of pointer depths for a group of pointer pixels that are continuous and positioned between the projection device and the target projection surface.

Example 36 includes the apparatus of example 35. In some examples, the processor determines a pointer depth of each of the pointer pixels.

Example 37 includes the apparatus of example 36. In some examples, the processor determines a touch occurs when the pointer depth of at least one of the pointer pixels indicates the pointer is in contact with the target projection surface.

Example 38 includes the apparatus of examples 36 or 37, the pointer depth includes a depth of a pixel projected on the pointer is closer to the target projection surface than any other pixel of the group of pixels.

Example 39 includes the apparatus of example 38. In some examples, a touch is determined to occur when a difference between the pointer depth and a depth of at least one pixel on the target projection surface is within a specified threshold.

Example 40 includes the apparatus of example 31. In some examples, the first light source is illuminated in a first frame of the touch interface image, and the second light source is emitted in a second frame after the first frame.

Example 41 includes a projection apparatus. Some examples include means to provide visible optical radiation, means to provide invisible optical radiation, means to project optical radiation, the means to project optical radiation projects each of a group of pixels in a frame of an image using optical radiation provided by the means to provide visible optical radiation and the means to provide invisible optical radiation.

Example 42 includes the projection apparatus of example 41. Some examples include means to determine a group of projection times corresponding to the pixels, means to determine a group of arrival times corresponding to the pixels, the arrival times represent when the invisible optical radiation from the depth light arrives at the depth receiver, and means to provide the projection times and the arrival times to a depth buffer, the depth buffer is to be used to determine a group of depths between the projection device and one or more actual projection surfaces of the projected pixels, the group of depths corresponding to the group of pixels.

Example 43 includes the projection apparatus of examples 41 or 42. Some examples include means to determine a depth light travel time for each pixel based on the projection times and the arrival times in the depth buffer.

Example 44 includes the projection apparatus of example 43. Some examples include means to determine the depths based on the depth light travel time for each pixel, the depth light travel time includes an amount of time for the depth light to travel from the projection device to the actual projection surfaces, and back to the projection device.

Example 45 includes the projection apparatus of example 44. In some examples, a pointer is indicated by a group of pointer depths for a group of pointer pixels that are continuous and positioned between the projection device and the target projection surface.

Example 46 includes the projection apparatus of example 45. Some examples include means to determine a pointer depth of each of the pointer pixels.

Example 47 includes the projection apparatus of example 46. Some examples include means to determine a touch occurs when the pointer depth of at least one of the pointer pixels indicates the pointer is in contact with the target projection surface.

Example 48 includes the projection apparatus of examples 46 or 47. In some examples, the pointer depth includes a depth of a pixel projected on the pointer that is closer to the target projection surface than any other pixel of the group of pixels.

Example 49 includes the projection apparatus of example 48. In some examples, a touch is determined to occur when a difference between the pointer depth and a depth of at least one pixel on the target projection surface is within a specified threshold.

Example 50 includes the projection apparatus of example 41. In some examples, the means to provide visible optical radiation is illuminated in a first frame of the touch interface image, and the means to provide invisible optical radiation is emitted in a second frame after the first frame.

Example 51 includes one or more tangible, non-transitory computer readable media for a touch interface for a projection device, comprising a group of instructions that, in response to being executed on one or more processors, cause the one or more processors to provide visible optical radiation, provide invisible optical radiation, and project optical radiation by projecting each of a group of pixels in a frame of an image using the visible optical radiation and the invisible optical radiation.

Example 52 includes the one or more tangible, non-transitory computer readable media of example 51. In some examples, the processor determines a group of projection times corresponding to the pixels, determines a group of arrival times corresponding to the pixels, the arrival times represent when the invisible optical radiation from the depth light arrives at the depth receiver, and provides the projection times and the arrival times to a depth buffer, the depth buffer is to be used to determine a group of depths between the projection device and one or more actual projection surfaces of the projected pixels, the group of depths corresponding to the group of pixels.

Example 53 includes the one or more tangible, non-transitory computer readable media of example 52. In some examples, the processor determines a depth light travel time for each pixel based on the projection times and the arrival times in the depth buffer.

Example 54 includes a method for a touch interface of a projection device. Some examples include providing visible optical radiation, providing invisible optical radiation, projecting optical radiation by projecting each of a group of pixels in a frame of an image using the visible optical radiation and the invisible optical radiation, determining a group of projection times corresponding to the pixels, determining a group of arrival times corresponding to the pixels, the arrival times represent when the invisible optical radiation from the depth light arrives at the depth receiver, and providing the projection times and the arrival times to a depth buffer, the depth buffer is to be used to determine a group of depths between the projection device and one or more actual projection surfaces of the projected pixels, the group of depths corresponding to the group of pixels.

Example 55 includes he method of example 53. Some examples include determining a depth light travel time for each pixel based on the projection times and the arrival times in the depth buffer, determining the depths based on the depth light travel time for each pixel, the depth light travel time includes an amount of time for the depth light to travel from the projection device to the actual projection surfaces, and back to the projection device, a pointer is indicated by a group of pointer depths for a group of pointer pixels that are continuous and positioned between the projection device and the target projection surface, determining a pointer depth of each of the pointer pixels, and determining a touch occurs when the pointer depth of at least one of the pointer pixels indicates the pointer is in contact with the target projection surface.

Example 56 includes an apparatus. Some examples include a first light source to provide visible optical radiation, a second light source to provide invisible optical radiation, a projection mechanism, a depth receiver, and a processor to cause the projection mechanism to project each of a group of pixels in a frame of an image using optical radiation provided by both the first light source and the second light source.

Example 57 includes the apparatus of example 56. In some examples, the processor determines a group of projection times corresponding to the pixels, determines a group of arrival times corresponding to the pixels, the arrival times represent when the invisible optical radiation from the depth light arrives at the depth receiver, and provides the projection times and the arrival times to a depth buffer, the depth buffer is to be used to determine a group of depths between the projection device and one or more actual projection surfaces of the projected pixels, the group of depths corresponding to the group of pixels.

Example 58 includes the apparatus of examples 56 or 57. In some examples, the processor determine a depth light travel time for each pixel based on the projection times and the arrival times in the depth buffer.

Example 59 includes the apparatus of example 58. In some examples, the processor determines the depths based on the depth light travel time for each pixel, the depth light travel time includes an amount of time for the depth light to travel from the projection device to the actual projection surfaces, and back to the projection device.

Example 60 includes the apparatus of example 59. In some examples, a pointer is indicated by a group of pointer depths for a group of pointer pixels that are continuous and positioned between the projection device and the target projection surface.

Example 61 includes the apparatus of example 60. In some examples, the processor determines a pointer depth of each of the pointer pixels.

Example 62 includes the apparatus of example 61. In some examples, the processor determines a touch occurs when the pointer depth of at least one of the pointer pixels indicates the pointer is in contact with the target projection surface.

Example 63 includes the apparatus of examples 61 or 62, the pointer depth includes a depth of a pixel projected on the pointer is closer to the target projection surface than any other pixel of the group of pixels.

Example 64 includes the apparatus of example 63. In some examples, a touch is determined to occur when a difference between the pointer depth and a depth of at least one pixel on the target projection surface is within a specified threshold.

Example 65 includes the apparatus of example 56. In some examples, the first light source is illuminated in a first frame of the touch interface image, and the second light source is emitted in a second frame after the first frame.

Example 66 includes a projection apparatus. Some examples include means to provide visible optical radiation, means to provide invisible optical radiation, means to project optical radiation, the means to project optical radiation projects each of a group of pixels in a frame of an image using optical radiation provided by the means to provide visible optical radiation and the means to provide invisible optical radiation.

Example 67 includes the projection apparatus of example 66. Some examples include means to determine a group of projection times corresponding to the pixels, means to determine a group of arrival times corresponding to the pixels, the arrival times represent when the invisible optical radiation from the depth light arrives at the depth receiver, and means to provide the projection times and the arrival times to a depth buffer, the depth buffer is to be used to determine a group of depths between the projection device and one or more actual projection surfaces of the projected pixels, the group of depths corresponding to the group of pixels.

Example 68 includes the projection apparatus of examples 66 or 67. Some examples include means to determine a depth light travel time for each pixel based on the projection times and the arrival times in the depth buffer.

Example 69 includes the projection apparatus of example 68. Some examples include means to determine the depths based on the depth light travel time for each pixel, the depth light travel time includes an amount of time for the depth light to travel from the projection device to the actual projection surfaces, and back to the projection device.

Example 70 includes the projection apparatus of example 69. In some examples, a pointer is indicated by a group of pointer depths for a group of pointer pixels that are continuous and positioned between the projection device and the target projection surface.

Example 71 includes the projection apparatus of example 70. Some examples include means to determine a pointer depth of each of the pointer pixels.

Example 72 includes the projection apparatus of example 71. Some examples include means to determine a touch occurs when the pointer depth of at least one of the pointer pixels indicates the pointer is in contact with the target projection surface.

Example 73 includes the projection apparatus of examples 71 or 72, the pointer depth includes a depth of a pixel projected on the pointer that is closer to the target projection surface than any other pixel of the group of pixels.

Example 74 includes the projection apparatus of example 73. In some examples, a touch is determined to occur when a difference between the pointer depth and a depth of at least one pixel on the target projection surface is within a specified threshold.

Example 75 includes the projection apparatus of example 66. In some examples, the means to provide visible optical radiation is illuminated in a first frame of the touch interface image, and the means to provide invisible optical radiation is emitted in a second frame after the first frame.

Example 76 includes a method for a touch interface of a projection device. Some examples include providing visible optical radiation, providing invisible optical radiation, projecting optical radiation by projecting each of a group of pixels in a frame of an image using the visible optical radiation and the invisible optical radiation, determining a group of projection times corresponding to the pixels, determining a group of arrival times corresponding to the pixels, the arrival times represent when the invisible optical radiation from the depth light arrives at the depth receiver, and providing the projection times and the arrival times to a depth buffer, the depth buffer is to be used to determine a group of depths between the projection device and one or more actual projection surfaces of the projected pixels, the group of depths corresponding to the group of pixels.

Example 77 includes the method of example 76. Some examples include determining a depth light travel time for each pixel based on the projection times and the arrival times in the depth buffer, and determining the depths based on the depth light travel time for each pixel, the depth light travel time includes an amount of time for the depth light to travel from the projection device to the actual projection surfaces, and back to the projection device, a pointer is indicated by a group of pointer depths for a group of pointer pixels that are continuous and positioned between the projection device and the target projection surface.

Example 78 includes the method of examples 76 or 77. Some examples include determining a pointer depth of each of the pointer pixels, and determining a touch occurs when the pointer depth of at least one of the pointer pixels indicates the pointer is in contact with the target projection surface.

Example 79 includes the method of example 78. Some examples include determining the depths based on the depth light travel time for each pixel, the depth light travel time includes an amount of time for the depth light to travel from the projection device to the actual projection surfaces, and back to the projection device, and a pointer is indicated by a group of pointer depths for a group of pointer pixels that are continuous and positioned between the projection device and the target projection surface.

Example 80 includes the method of example 79. Some examples include determining a pointer depth of each of the pointer pixels, and determining a touch occurs when the pointer depth of at least one of the pointer pixels indicates the pointer is in contact with the target projection surface.

Example 81 includes an apparatus. Some examples include a first light source to provide visible optical radiation, a second light source to provide invisible optical radiation, a projection mechanism, a depth receiver, and a processor to cause the projection mechanism to project each of a group of pixels in a frame of an image using optical radiation provided by both the first light source and the second light source.

Example 82 includes the apparatus of example 81. In some examples, the processor determines a group of projection times corresponding to the pixels, determines a group of arrival times corresponding to the pixels, the arrival times represent when the invisible optical radiation from the depth light arrives at the depth receiver, and provides the projection times and the arrival times to a depth buffer, the depth buffer is to be used to determine a group of depths between the projection device and one or more actual projection surfaces of the projected pixels, the group of depths corresponding to the group of pixels.

Example 83 includes the apparatus of examples 81 or 82. In some examples, the processor determines a depth light travel time for each pixel based on the projection times and the arrival times in the depth buffer.

Example 84 includes the apparatus of examples 82 or 83. In some examples, the processor determines the depths based on the depth light travel time for each pixel, the depth light travel time includes an amount of time for the depth light to travel from the projection device to the actual projection surfaces, and back to the projection device.

Example 85 includes the apparatus of example 84. In some examples, a pointer is indicated by a group of pointer depths for a group of pointer pixels that are continuous and positioned between the projection device and the target projection surface.

Example 86 includes the apparatus of example 85. In some examples, the processor determines a pointer depth of each of the pointer pixels.

Example 87 includes the apparatus of example 86. In some examples, the processor determines a touch occurs when the pointer depth of at least one of the pointer pixels indicates the pointer is in contact with the target projection surface.

Example 88 includes the apparatus of examples 86 or 87, the pointer depth includes a depth of a pixel projected on the pointer is closer to the target projection surface than any other pixel of the group of pixels.

Example 89 includes the apparatus of example 88. In some examples, a touch is determined to occur when a difference between the pointer depth and a depth of at least one pixel on the target projection surface is within a specified threshold.

Example 90 includes the apparatus of example 81. In some examples, the first light source is illuminated in a first frame of the touch interface image, and the second light source is emitted in a second frame after the first frame.

Example 91 includes a projection apparatus. Some examples include means to provide visible optical radiation, means to provide invisible optical radiation, and means to project optical radiation, the means to project optical radiation projects each of a group of pixels in a frame of an image using optical radiation provided by the means to provide visible optical radiation and the means to provide invisible optical radiation.

Example 92 includes the projection apparatus of example 91. Some examples include means to determine a group of projection times corresponding to the pixels, means to determine a group of arrival times corresponding to the pixels, the arrival times represent when the invisible optical radiation from the depth light arrives at the depth receiver, and means to provide the projection times and the arrival times to a depth buffer, the depth buffer is to be used to determine a group of depths between the projection device and one or more actual projection surfaces of the projected pixels, the group of depths corresponding to the group of pixels.

Example 93 includes the projection apparatus of examples 91 or 92, comprising means to determine a depth light travel time for each pixel based on the projection times and the arrival times in the depth buffer.

Example 94 includes a method for a touch interface of a projection device. Some examples include providing visible optical radiation, providing invisible optical radiation, projecting optical radiation by projecting each of a group of pixels in a frame of an image using the visible optical radiation and the invisible optical radiation, determining a group of projection times corresponding to the pixels, determining a group of arrival times corresponding to the pixels, the arrival times represent when the invisible optical radiation from the depth light arrives at the depth receiver, and providing the projection times and the arrival times to a depth buffer, the depth buffer is to be used to determine a group of depths between the projection device and one or more actual projection surfaces of the projected pixels, the group of depths corresponding to the group of pixels.

Example 95 includes the method of example 94. Some examples include determining a depth light travel time for each pixel based on the projection times and the arrival times in the depth buffer, determining the depths based on the depth light travel time for each pixel, the depth light travel time includes an amount of time for the depth light to travel from the projection device to the actual projection surfaces, and back to the projection device, a pointer is indicated by a group of pointer depths for a group of pointer pixels that are continuous and positioned between the projection device and the target projection surface, determining a pointer depth of each of the pointer pixels, and determining a touch occurs when the pointer depth of at least one of the pointer pixels indicates the pointer is in contact with the target projection surface.

What is claimed is:

1. An apparatus, comprising:
   a first light source to provide visible optical radiation;
   a second light source to provide invisible optical radiation using structured infrared to project a pattern;
   a projection device to project the visible optical radiation and the invisible optical radiation onto a target projection surface;
   a depth receiver; and
   a processor to:
      cause the projection device to project each of a group of pixels onto the target projection surface in a frame of a touch interface image using optical radiation provided by both the first light source and the second light source;
      determine a depth of one or more of the group of pixels using triangulation based on an angle of projection of the projected pattern and on an angle of incidence at the depth receiver; and
      indicate a pointer by a group of pointer depths for pointer pixels included as some of the group of pixels that are continuous and positioned between the projection device and the target projection surface.

2. The apparatus of claim 1, the processor to:
   determine a group of projection times corresponding to the pixels;
   determine a group of arrival times corresponding to the pixels, wherein the arrival times represent when the invisible optical radiation from the depth light arrives at the depth receiver; and
   provide the projection times and the arrival times to a depth buffer, wherein the depth buffer is to be used to determine a group of depths between the projection device and one or more actual projection surfaces of the projected pixels, the group of depths corresponding to the group of pixels.

3. The apparatus of claim 2, the processor to determine a depth light travel time for each pixel based on the projection times and the arrival times in the depth buffer.

4. The apparatus of claim 3, the processor to determine the depths based on the depth light travel time for each pixel, wherein the depth light travel time comprises an amount of time for the depth light to travel from the projection device to the actual projection surfaces, and back to the projection device.

5. The apparatus of claim 1, the processor to determine a pointer depth of each of the pointer pixels.

6. The apparatus of claim 5, the processor to determine a touch occurs when the pointer depth of at least one of the pointer pixels indicates the pointer is in contact with the target projection surface.

7. The apparatus of claim 5, wherein the pointer depth comprises a depth of a pixel projected on the pointer, that is closer to the target projection surface than any other pixel of the group of pixels.

8. The apparatus of claim 7, wherein a touch is determined to occur when a difference between the pointer depth and a depth of at least one pixel on the target projection surface is within a specified threshold.

9. The apparatus of claim 1, wherein the first light source is illuminated in a first frame of the touch interface image, and wherein the second light source is emitted after the first frame in a second frame of the touch interface image.

10. The apparatus of claim 1, the processor to:
determine whether the pointer is being tracked;
if the pointer is being tracked, determine the depth of the pointer; and
if the pointer is not being tracked, determine whether to start tracking the pointer based on depths of actual and target projection surfaces.

11. The apparatus of claim 1, the processor to determine whether a touch has occurred based on a depth of the pointer and a depth of the target projection surface.

12. A projection apparatus, comprising:
means to provide visible optical radiation;
means to provide invisible optical radiation using structured infrared to project a pattern;
means to project the visible optical radiation and the invisible optical radiation onto a target projection surface, wherein the means to project optical radiation projects each of a group of pixels onto the target projection surface in a frame of a touch interface image using optical radiation provided by the means to provide visible optical radiation and the means to provide invisible optical radiation;
means to receive the projected pattern;
means to determine a depth of one or more of the group of pixels using triangulation based on an angle of projection of the projected pattern and on an angle of incidence at the means to receive; and
means to indicate a pointer by a group of pointer depths for pointer pixels included as some of the group of pixels that are continuous and positioned between the means to project optical radiation and the target projection surface.

13. The projection apparatus of claim 12, comprising:
means to determine a group of projection times corresponding to the pixels;
means to determine a group of arrival times corresponding to the pixels, wherein the arrival times represent when the invisible optical radiation from the depth light arrives at the depth receiver; and
means to provide the projection times and the arrival times to a depth buffer, wherein the depth buffer is to be used to determine a group of depths between the projection device and one or more actual projection surfaces of the projected pixels, the group of depths corresponding to the group of pixels.

14. The projection apparatus of claim 13, comprising means to determine a depth light travel time for each pixel based on the projection times and the arrival times in the depth buffer.

15. The projection apparatus of claim 14, comprising means to determine the depths based on the depth light travel time for each pixel, wherein the depth light travel time comprises an amount of time for the depth light to travel from the projection device to the actual projection surfaces, and back to the projection device.

16. The projection apparatus of claim 12, comprising means to determine a pointer depth of each of the pointer pixels.

17. The projection apparatus of claim 16, comprising means to determine a touch occurs when the pointer depth of at least one of the pointer pixels indicates the pointer is in contact with the target projection surface.

18. The projection apparatus of claim 16, wherein the pointer depth comprises a depth of a pixel projected on the pointer, that is closer to the target projection surface than any other pixel of the group of pixels.

19. The projection apparatus of claim 18, wherein a touch is determined to occur when a difference between the pointer depth and a depth of at least one pixel on the target projection surface is within a specified threshold.

20. The projection apparatus of claim 12, wherein the means to provide visible optical radiation is provided in a first frame of the touch interface image, and wherein the means to provide invisible optical radiation is provided after the first frame in a second frame of the touch interface image.

21. The projection apparatus of claim 12, comprising:
means to determine whether the pointer is being tracked;
means to determine the depth of the pointer if the pointer is being tracked; and
means to determine whether to start tracking the pointer based on depths of actual and target projection surfaces if the pointer is not being tracked.

22. The projection apparatus of claim 12, comprising means to determine whether a touch has occurred based on a depth of the pointer and a depth of the target projection surface.

23. One or more tangible, non-transitory computer readable media for a touch interface for a projection device, comprising a group of instructions that, in response to being executed on one or more processors, cause the one or more processors to:
provide visible optical radiation;
provide invisible optical radiation using structured infrared to project a pattern;
project optical radiation to project the visible optical radiation and the invisible optical radiation onto a target projection surface by projecting each of a group of pixels onto the target projection surface in a frame of a touch interface image using the visible optical radiation and the invisible optical radiation;
receive the projected pattern;
determine a depth of one or more of the group of pixels using triangulation based on an angle of projection of the projected pattern and on an angle of incidence of the received projected pattern; and indicate a pointer by a group of pointer depths for pointer pixels included as some of the group of pixels that are continuous and positioned between a target projection surface and a location where the visible optical radiation and invisible optical radiation are provided.

24. The one or more tangible, non-transitory computer readable media of claim 23, wherein the instructions, in response to being executed on one or more processors, cause the one or more processors to:
  determine a group of projection times corresponding to the pixels;
  determine a group of arrival times corresponding to the pixels, wherein the arrival times represent when the invisible optical radiation from the depth light arrives at the depth receiver; and
  provide the projection times and the arrival times to a depth buffer, wherein the depth buffer is to be used to determine a group of depths between the projection device and one or more actual projection surfaces of the projected pixels, the group of depths corresponding to the group of pixels.

25. The one or more tangible, non-transitory computer readable media of claim 24, wherein the instructions, in response to being executed on one or more processors, cause the one or more processors to determine a depth light travel time for each pixel based on the projection times and the arrival times in the depth buffer.

26. The one or more tangible, non-transitory computer readable media of claim 25, wherein the instructions, in response to being executed on one or more processors, cause the one or more processors to determine the depths based on the depth light travel time for each pixel, wherein the depth light travel time comprises an amount of time for the depth light to travel from the projection device to the actual projection surfaces, and back to the projection device.

27. The one or more tangible, non-transitory computer readable media of claim 23, wherein the instructions, in response to being executed on one or more processors, cause the one or more processors to determine a pointer depth of each of the pointer pixels.

28. The one or more tangible, non-transitory computer readable media of claim 27, wherein the instructions, in response to being executed on one or more processors, cause the one or more processors to determine a touch occurs when the pointer depth of at least one of the pointer pixels indicates the pointer is in contact with the target projection surface.

29. The one or more tangible, non-transitory computer readable media of claim 27, wherein the pointer depth comprises a depth of a pixel projected on the pointer, that is closer to the target projection surface than any other pixel of the group of pixels.

30. The one or more tangible, non-transitory computer readable media of claim 29, wherein a touch is determined to occur when a difference between the pointer depth and a depth of at least one pixel on the target projection surface is within a specified threshold.

31. The one or more tangible, non-transitory computer readable media of claim 23, wherein the visible optical radiation is illuminated in a first frame of the touch interface image, and wherein the invisible optical radiation is emitted after the first frame in a second frame of the touch interface image.

32. The one or more tangible, non-transitory computer readable media of claim 23, wherein the instructions, in response to being executed on one or more processors, cause the one or more processors to:
  determine whether the pointer is being tracked;
  determine the depth of the pointer if the pointer is being tracked; and
  determine whether to start tracking the pointer based on depths of actual and target projection surfaces if the pointer is not being tracked.

33. The one or more tangible, non-transitory computer readable media of claim 23, wherein the instructions, in response to being executed on one or more processors, cause the one or more processors to determine whether a touch has occurred based on a depth of the pointer and a depth of the target projection surface.

* * * * *